United States Patent Office 2,741,036
Patented Apr. 10, 1956

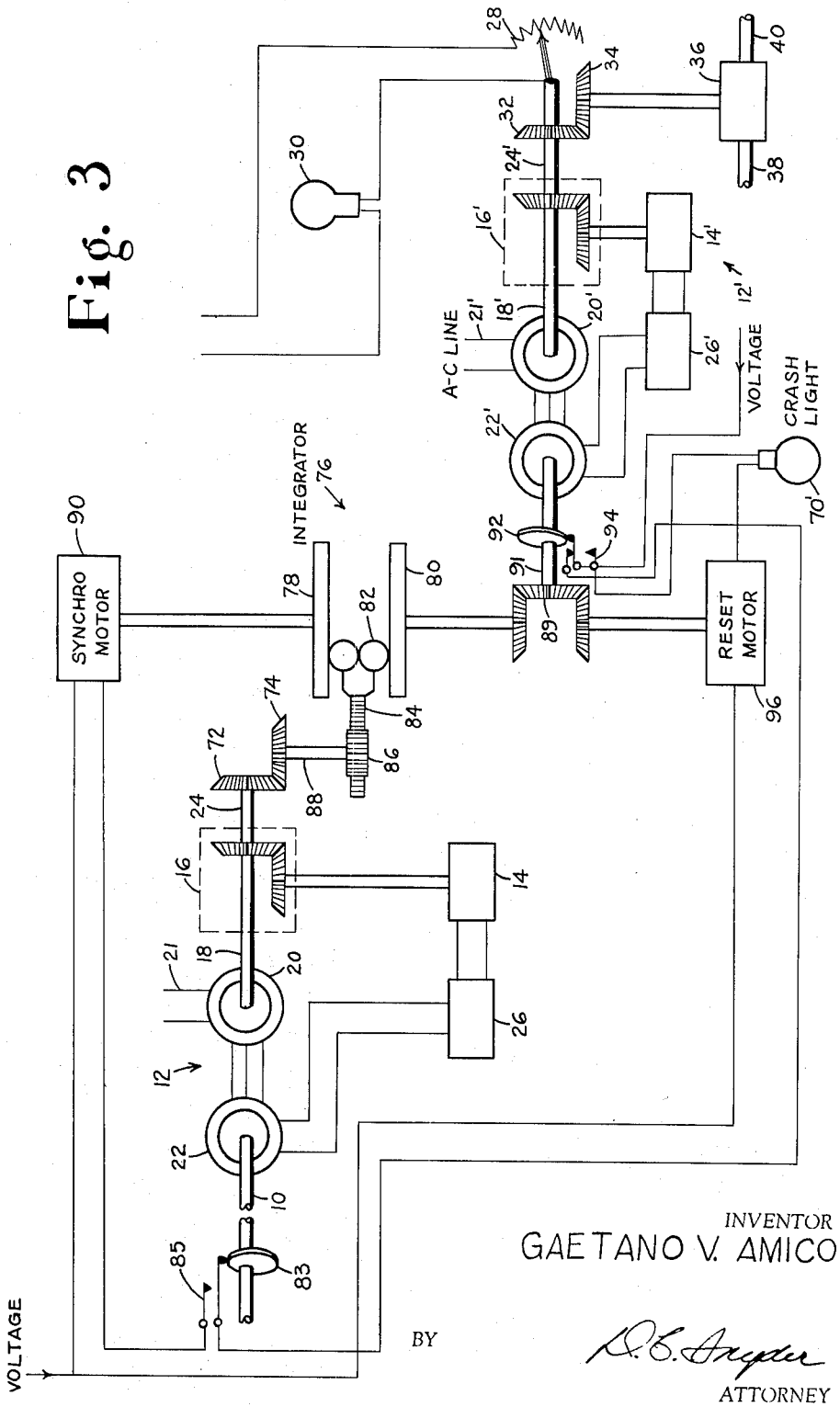

2,741,036
ANGULAR ACCELERATION EFFECTS SIMULATOR

Gaetano V. Amico, Hicksville, N. Y., assignor to the United States of America as represented by the Secretary of the Navy Application July 11, 1952, Serial No. 298,479

16 Claims. (Cl. 35—12)

(Granted under Title 35, U. S. Code (1952), sec. 266)

The invention described herein may be manufactured and used by or for the Government of the United States of America for governmental purposes without the payment of any royalties thereon or therefor.

The invention relates to a device intended to simulate the "graying" and "blacking out" by a pilot. The "graying" stage occurs just before actual unconsciousness takes place and at which time the visual perception is impaired, the ultimate "blacking out" taking place in the final stage of continued angular acceleration. Such "blacking out" occurs under flight conditions when there are extreme angular accelerating effects, or "G." In such instances, the pilot loses consciousness due to drainage of blood from the head, and if unconsciousness is prolonged, the aeroplane might crash. Also, when the angular acceleration is diminished, or changes due to other conditions, the pilot will regain consciousness. As he does so, his senses are disoriented and he must rely on instrumentation to again regain control of the airplane. The instant invention is designed to familiarize the pilot with such effects and to measure the "graying" and "blacking out" conditions for a pilot, by the control of environmental lighting as a function of G, or change in angular position and time or as an integral of G and time.

An object of the invention is to provide simulated "graying" and "black-out" conditions.

Another object of the invention is to enable a trainee to ascertain when he has exceeded "black-out" tolerance, which would occur if actual conditions were present.

Still another object of the invention is to introduce angular acceleration effects or "G" by control of environmental lighting as a function of "G."

Yet another object of the invention is to vary lighting due to angular position and time in order to obtain angular acceleration effects.

And yet another object of the invention is to vary light conditions as the integral of time and acceleration.

A more specific object of the invention is to dim the lighting in the cockpit of a plane or flight simulator as "G" increases in order to simulate loss of vision occurring to the pilot during the "graying-out" or "black-out" stages where he exceeds his tolerances to the effect of "G."

Still another object of the invention is to adapt the device to conditions where "G" suit equipment is used.

Figure 1:
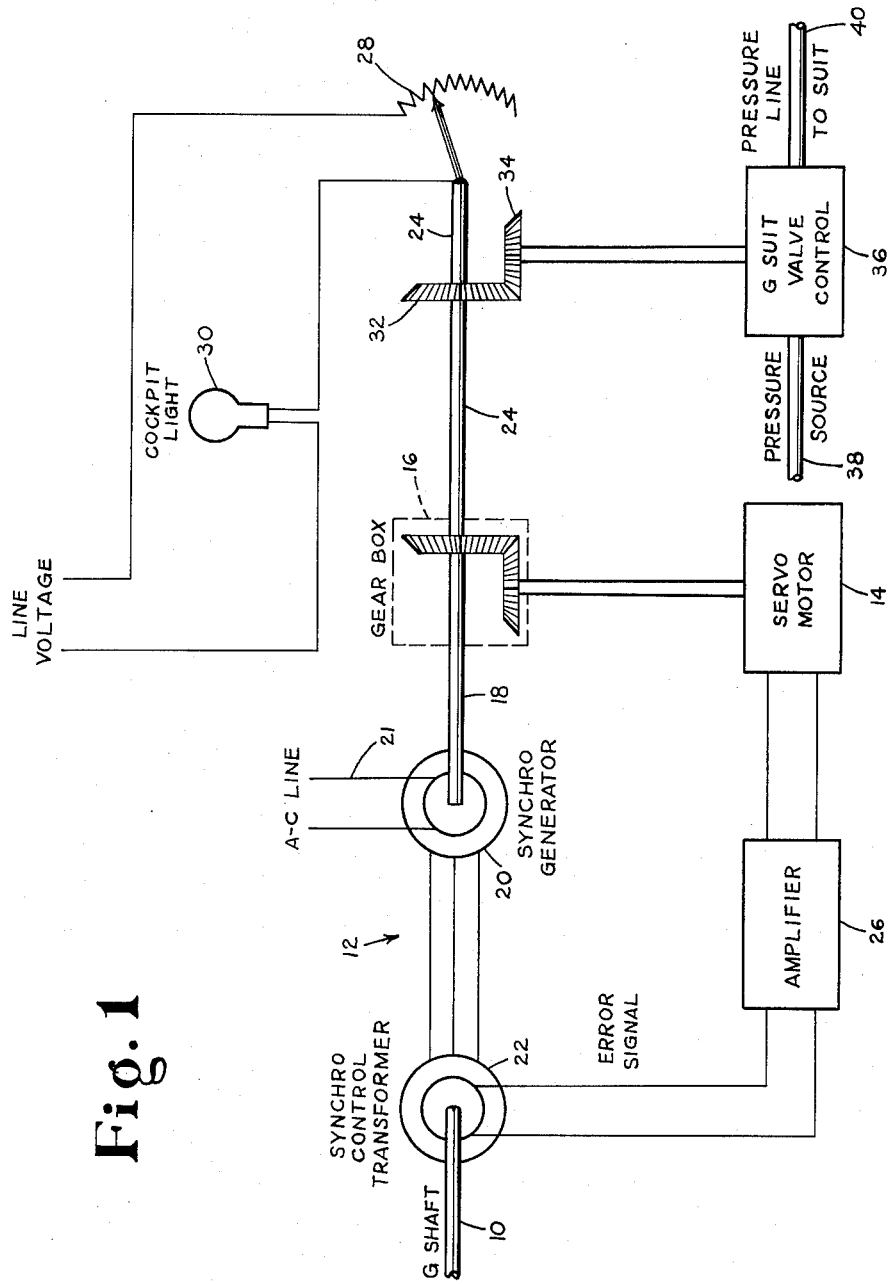
Figure 2:
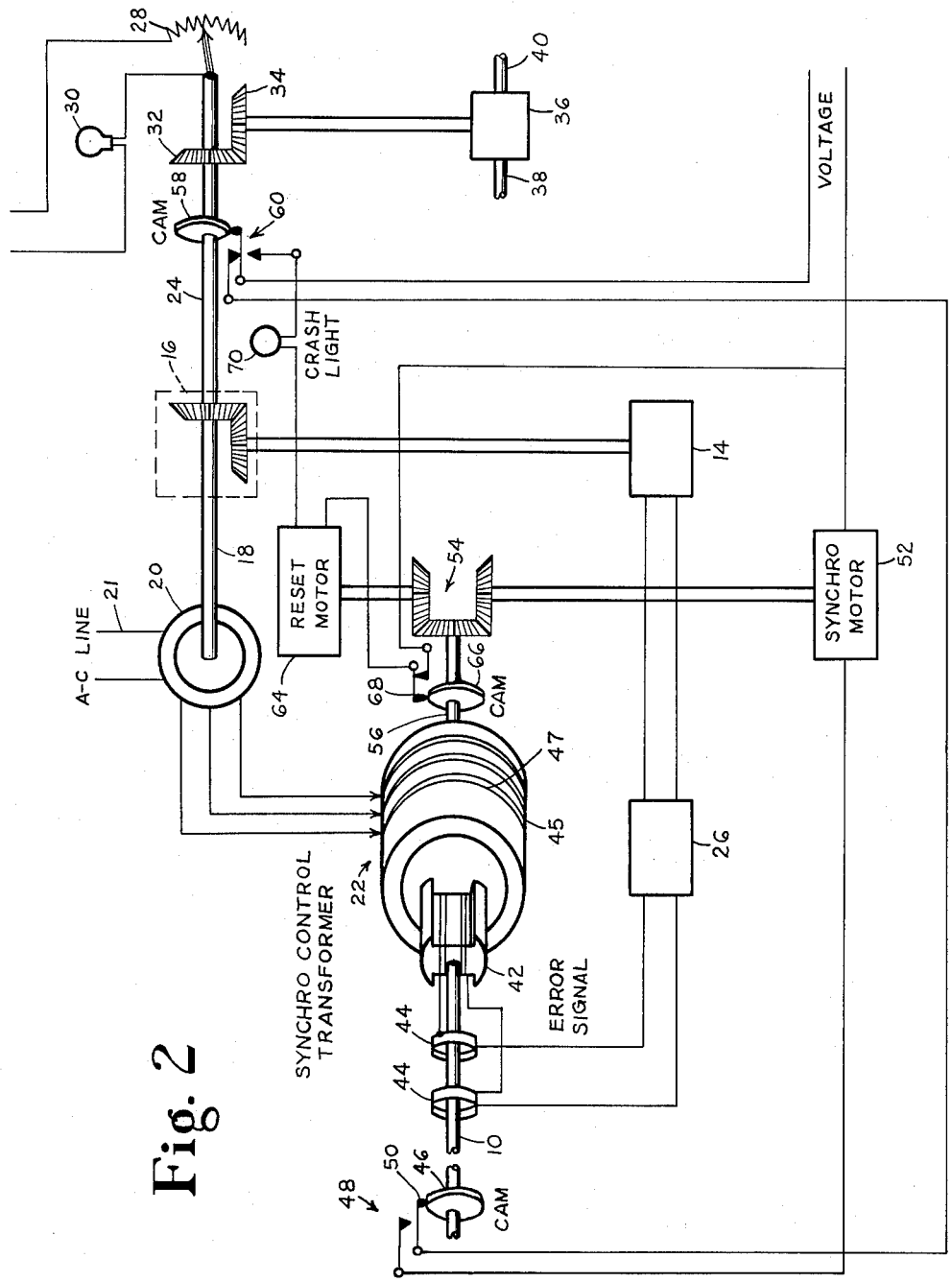

Other objects and many of the attendant advantages of this invention will be readily appreciated as the same becomes better understood by reference to the following detailed description when considered in connection with the accompanying drawings wherein:

Fig. 1 discloses one form of the invention in schematic arrangement;

Fig. 2 shows a modified embodiment of Fig. 1 in that the time lapse before black-out for each pilot is taken into consideration, and Fig. 3 discloses a further modification wherein acceleration and time factors are integrated to black-out the cockpit.

Referring to Fig. 1, 10 identifies a shaft G connected at one end to an aerodynamic computer (not shown) which develops the function of angular acceleration in flight and thus shaft G is rotated in proportion to the gravity or "G" effect produced by angular acceleration in flight. Shaft 10 is mechanically connected to a servo control system 12. Servomotor 14 of this system drives the output load through reduction gears 16. Output shaft 18 from reduction gear 16 is connected to the rotor of synchro-generator 20 receiving its current from an A.-C. line 21. The angular position of the output shaft is shown by the voltages appearing at the stator terminals of generator 20. These voltages are applied to the stator winding of synchro control transformer 22, the rotor of which is mechanically connected to G-shaft 10. The voltage from transformer 22 thus represents the angular difference, or error, between the input on shaft 10 and the output load on shaft 24. The voltage from transformer 22 is applied to amplifier 26 which in turn drives servomotor 14. Servomotor 14 drives the shaft 18 and generator 20 in a direction to cause the shaft to follow the motion of shaft 10 and thereby balance the output signal of transformer 22. Where desired, a potentiometer may be substituted for operation with the servo amplifier. Output shaft 24 is integral with and forms a continuation of shaft 18. Shaft 24 is connected with some means to control the intensity of the cockpit illumination as a function of the acceleration. While a variable resistor 28 is illustrated, other equivalent means such as a saturable reactor or an auto transformer may be used. Resistor 28 is so designed that no reduction in light intensity occurs until a predetermined acceleration, as for example, up to 3G is produced. This takes into consideration the fact that no blacking out occurs at low accelerations, and only after a minimum value is obtained, does such effect take place. Resistor 28 is designed to operate at a range from a minimum of zero to a decrease in intensity linearly up to 9G where illumination is reduced to zero to obtain a black-out effect on cockpit light 30.

The device of the invention is adapted to be used with G suit equipment worn by the pilot or trainee. When a pilot flies an aircraft equipped with a G-suit, he will normally feel an increase in pressure around his body when the aircraft goes through a maneuver which result in an increased G-effect. The actual equipment is designed so that the suit pressure increases in proportion to the increase in G-effect. The purpose for this is to increase body pressure as G-effect increases to compensate for this effect and prevent a blackout. Therefore, when a pilot receives a sensation of increasing or decreasing suit pressure he consequently knows that the G-effect is increasing or decreasing proportionately. Thus, the pilot feels no blackout or ordinary G-effect but he learns to recognize and to evaluate the effect in accordance with the change in suit pressure. Bevel gear 32 is mounted on shaft 24 to mesh with pinion 34, pinion 34 being operatively connected to G suit valve control 36. Valve 36 is designed so that pressure to the suit corresponds to the pressure obtained during operating conditions. A pressure source 38 leads to the valve control means for transfer by means of pressure line 40 to the suit worn by the trainee pilot.

The above described system is basic for illustrating the effects of gravity or angular acceleration and is adequate if it is desired to merely disclose black-out results. However, allowance for the time elapsing before a pilot blacks out under a specific G is not taken into consideration in this form. This is provided for in the modification shown in Fig. 2.

G shaft 10 is operatively connected to the rotor 42 of synchro control transformer 22. Slip rings 44 send a signal to amplifier 26 which amplifies this signal to drive servomotor 14, which in turn operates reduction gear 16 to operate generator 20 and stator 45 through shaft 18 until an equal and opposite signal is applied to the servo amplifier to balance the input signal. When the preselected acceleration effect is reached, cock-pit light 30 begins to dim. At this time, cam 46 on shaft 10 actuates a switch 48 by closing contacts 50 to start synchro-motor 52. Synchro-motor or timing motor 52 is operatively connected with differential 54 which in turn is connected to the stator 45 of transformer 22 by means of connecting shaft 56 and acts to turn said stator. Slip rings 47 on this stator provide electrical connection with generator 20. Thus the time elapsing before blacking out takes place is provided for in the device.

After black-out has occurred, transformer 22 is returned to zero time position through operation of cam 58. Cam 58 controls a two position switch 60. During the time a "G" effect is occurring, the circuit which controls the timing motor 52 is closed. When the black-out or maximum allowable acceleration for the aircraft has been exceeded, cam 58 operates to break the circuit of synchro motor 52 at switch 60 and closes the circuit through switch 60 to reset motor 64. This returns transformer 22 to the starting value, and when such value is obtained, a cam 66 on shaft 56 actuates switch 68 to open the circuit and thereby stop reset motor 64.

A crash light 70 may be provided in the circuit to indicate what actually occurs were the pilot to black-out in flight.

As in Fig. 1, the amplified signal is transmitted to resister 28 to control the light in the cockpit of the plane and when acceleration effects have reached a maximum condition and the pilot has blacked out, light 30 goes out to simulate the effect.

If a G suit is used, pressure is provided through valve 36 as controlled by rotation of shaft 24 through the gear and pinion means previously described.

A further modification of the basic invention takes into consideration the factor that high accelerations for very short periods of time do not cause the pilot to lose consciousness since the duration of the effect is not sufficient to insure a complete black-out. This is depicted by varying the lighting in the cockpit as a function of acceleration and time. Thus, while in Fig. 2 the servo positions provide a G-effect at once, the simulator illustrated in Fig. 3 permits high accelerations for a short time with no dimming of the light 30 in the cockpit of the plane.

G shaft 10 is connected to an aerodynamic computer and to the servo control system 12, as described above. Thus, the servo control system 12 operates to rotate shafts 13 and 24 to effect rotation of the gear 72 and pinion 74 to move rack 84. Integrator 76 consists of two plates 78 and 80 spaced apart by the speed control balls 82. These, in turn, are secured to rack member 84 adapted to be actuated by means of pinion 86 operatively secured by shaft 88 to bevel gear 74. Differential gearing 89 is operatively connected to transformer 22' by means of shaft 91. The circuit to synchro timing motor 90 is open at the start of the operation until the predetermined minimum acceleration (such as a G of 3, as before selected) is reached. This indicates that the student pilot is beginning to black-out due to increased acceleration and the circuit to synchro motor 90 is closed by rotation of cam 83 on G-arm 10 to close switch 85. Closing of the circuit starts rotation of the input plate member 78 of integrator 76. Rotation is imparted to output plate member 80 to operate a second servo control system 12' through the differential gears 89 and shaft 91. Servo systems 12 and 12' cooperate through the connecting medium of the integrator 76 to provide time and accelerator integration of this problem. The like parts of servo system 12 occurring in system 12' are identified by prime numerals and thus servomotor 14' operates generator 20' through reduction gears 16' and shaft 18' to convey an amplified signal 26' received from transformer 22' to balance the input signal, as was more explicitly explained above.

When black-out conditions are reached, cam 92 actuates a two-position switch 94 to open the synchro motor circuit 99 and start motor 96 to reset transformer 22' to the zero position. Then switch 94 is reversed to close the circuit to synchro motor 90. When a minimum black-out acceleration is again reached, switch 85 closes to repeat the effect.

Shaft 24 relays the output angular position of shaft 91 to resistor 28 and as a very high value of acceleration is reached over a short period of time or a relatively low value of acceleration is maintained over a long period of time, the cockpit light 30 becomes increasingly dim until black-out conditions are obtained. In the use of a G-suit, valve 36 will control the pressure to the suit, as the effect of acceleration is simulated. Light 70' is used to indicate the plane crash when blacking out has taken place. Thus, in this form of the invention, through the integration of acceleration and time, high gravity effects may be simulated where for short periods of time no dimming of the light in the cockpit will take place.

Obviously many modifications and variations of the present invention are possible in the light of the above teachings. It is therefore to be understood that within the scope of the appended claims the invention may be practiced otherwise than as specifically described.

What is claimed is:

1. In a training device to simulate pilot black-out by illumination control, means for connection to an angular acceleration function producing structure, said means having signal receiving means connected thereto, environmental illumination control means and signal amplifying means operatively connected to said receiving means and control means connected to said illumination control means whereby the environmental illumination is varied in response to acceleration conditions, said device including an acceleration suit valve and transfer means in operative relation between said suit valve and amplifier whereby acceleration changes are transmitted to a suit.

2. In a training device to simulate pilot black-out by illumination control, means for connection to an angular acceleration function producing structure, said means having signal receiving and output means connected thereto, environmental illumination control means connected to said output means, and means operatively connected to said output means to reset signal receiving means when a black-out has been indicated.

3. In a black-out simulating trainer, means for connection to an angular acceleration function producing structure, said means having signal receiving and output means connected thereto, a timing motor connected to said signal receiving means and to said acceleration means, means to operate said motor to provide for a time lapse before black-out occurs, resetting means secured to said timing motor, amplifying means operative with said signal means and illuminating control means connected to said output means and actuated by the accelerating effect in the flight simulation.

4. In a black-out simulating trainer, means for connection to an angular acceleration function producing structure, said means having signal receiving and output means connected thereto, a timing motor connected to said signal receiving means and to said acceleration means, a cam on said acceleration means, electrical means operatively connecting said cam and motor to actuate the motor on attaining a predetermined acceleration effect, amplifying means connected to said output means in said trainer, a cam operatively controlled by said amplifying means, switch control means operatively connecting said last named cam and motor, means to reset said motor on completion of an operating cycle, and illuminating control means actuated by the accelerating effect in the flight simulator.

5. The combination of claim 3 wherein said trainer includes an acceleration suit and transfer means in operative relation between said suit and amplifier whereby acceleration changes are transmitted to the suit.

6. In a training device to simulate pilot black-out by illumination control, means for connection to an angular acceleration function producing structure, said means having signal receiving means connected thereto, environmental illumination control means and signal amplifying means operatively connected to said receiving means, control means whereby the environmental illumination is varied in response to acceleration conditions; said training device including integrator means to integrate acceleration and time, a timing motor, and means operatively connecting said integrator and motor to integrate the acceleration and time elements of the training device.

7. The combination of claim 6 wherein said trainer includes an acceleration suit and transfer means in operative relation between said suit and amplifier whereby acceleration changes are transmitted to the suit.

8. In a black-out simulator wherein blackout conditions are simulated by reduction in cockpit illumination, acceleration means secured to a potentiometer to receive an acceleration signal, an amplifier to increase the power of said signal and resistance means to receive said increased signal to dim the cockpit lights; said simulator including a synchro motor operatively connected to said acceleration means to rotate at a predetermined value, drive means controlled by said amplifier and actuated by said motor to integrate the time and acceleration factors, means to reset said resistance, an acceleration suit valve and transfer means in operative relation between said suit valve and amplifier whereby acceleration changes are transmitted to a suit.

9. In an integrated training blackout simulator including an acceleration responsive means and signal receiving means responsive to said acceleration responsive means, signal amplifying means operatively connected to said receiving means, a timing motor, a two-disc integrator connected to said signal receiving means and to said timing motor, a potentiometer controlled by said integrator and means to receive said integrated information of acceleration and time to control illumination in the simulator.

10. The combination of claim 9 wherein said integrator includes a first disc operatively connected to said timing motor, a second disc operatively connected to said potentiometer, ball means coacting with said discs to vary the acceleration transmitted from the first disc to the second disc, and rack and pinion means connected to said signal amplifying means to position the ball means between the discs of the integrator.

11. The combination of claim 10 wherein an acceleration suit valve is provided and transfer means are in operative relation between said suit valve and amplifier, whereby acceleration changes are transmitted to a suit.

12. In a training device to simulate pilot black-out by environmental illumination control, a servo control system, an acceleration input shaft and a shaft output connected with said servo control system, amplifying means retained in said servo system and control means operative with said output shaft to vary the environmental illumination in response to simulated acceleration conditions.

13. The combination of claim 12 wherein said output shaft includes gear means and an acceleration suit valve for connection to a pilot training pressure suit in operative relation to said gear means to transfer acceleration pressure from said shaft to the pressure suit.

14. In a training device to simulate pilot black-out by illumination control, a servo control system, an acceleration input shaft and a shaft output connected with said servo control system, amplifying means connected to said shafts to amplify a signal, a first cam mounted on said input shaft, a second cam on said output shaft to operate when the maximum acceleration is attained and a reset motor operative with said servo system to return the training device to the starting position.

15. In a training device to simulate pilot black-out by illumination control, a first servo control system, an acceleration input shaft and a shaft output connected with said servo control system, a second servo system including an acceleration input shaft and an output shaft, environmental illumination control means on said second input shaft, an integrator operatively connected between said servo systems to integrate acceleration and time, a reset motor operative with said integrator, cam means on the first of said input shafts to control the movement of the integrator and a cam on the second of said input shafts operative with said reset motor to reset the first input shaft when the desired effect has been obtained.

16. The combination of claim 15, including an acceleration suit valve for connection to a pilot training pressure suit, gear means on said second output shaft operative with said acceleration suit valve to transfer acceleration pressure from said shaft to the pressure suit.

References Cited in the file of this patent

UNITED STATES PATENTS

| | | |
|---|---|---|
| 2,440,342 | Mayne | Apr. 27, 1948 |
| 2,687,580 | Dehmel | Aug. 31, 1954 |